US011615294B2

(12) United States Patent
Pan et al.

(10) Patent No.: US 11,615,294 B2
(45) Date of Patent: Mar. 28, 2023

(54) METHOD AND APPARATUS BASED ON POSITION RELATION-BASED SKIP-GRAM MODEL AND STORAGE MEDIUM

(71) Applicant: Beijing Xiaomi Intelligent Technology Co., Ltd., Beijing (CN)

(72) Inventors: Xiaotong Pan, Beijing (CN); Zuopeng Liu, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 738 days.

(21) Appl. No.: 16/588,626

(22) Filed: Sep. 30, 2019

(65) Prior Publication Data

US 2020/0265297 A1    Aug. 20, 2020

(30) Foreign Application Priority Data

Feb. 14, 2019  (CN) .......................... 201910113567.2

(51) Int. Cl.
*G06N 3/04*      (2023.01)
*G06F 40/284*    (2020.01)
*G06F 17/16*     (2006.01)

(52) U.S. Cl.
CPC .......... *G06N 3/0472* (2013.01); *G06F 17/16* (2013.01); *G06F 40/284* (2020.01)

(58) Field of Classification Search
CPC ........ G06N 3/00; G06N 3/0472; G06F 17/00; G06F 17/16; G06F 40/00; G06F 40/284
See application file for complete search history.

(56) References Cited

U.S. PATENT DOCUMENTS 10,755,028 B2 *  8/2020  Kataoka ................ G06F 40/289
2016/0247061 A1 *  8/2016  Trask ....................... G06N 3/04
(Continued)

FOREIGN PATENT DOCUMENTS

CN   105930318 A      9/2016
CN   107239444 A *  10/2017 ........... G06F 17/277
(Continued)

OTHER PUBLICATIONS

David Guthrie, Ben Allison, Wei Liu, Louise Guthrie, and Yorick Wilks. 2006. A Closer Look at Skip-gram Modelling. In Proceedings of the Fifth International Conference on Language Resources and Evaluation (LREC'06), Genoa, Italy. European Language Resources Association (ELRA). (Year: 2006).*

(Continued)

*Primary Examiner* — Daniel C Washburn
*Assistant Examiner* — Sean E Serraguard
(74) *Attorney, Agent, or Firm* — Oblon, McClelland, Maier & Neustadt, L.L.P.

(57) ABSTRACT

The present disclosure relates to a method and an apparatus based on a neural network model. The method includes acquiring a plurality of training samples, each of the training samples comprising an identifier of an input word, an identifier of an output word, and position information, wherein in one of the training samples, the output word is a context of the input word, and the position information indicates a relative position between the output word and the input word; calling a position relation-based Continuous Skip-gram Model (Skip-Gram), with each of the training samples as an input, to obtain an output result, the output result comprising a word matrix embedding of the input word, a word matrix embedding of the output word and a position matrix embedding of the position information; and (Continued)

updating the position relation-based Skip-Gram based on the output result to train the position relation-based Skip-Gram.

15 Claims, 10 Drawing Sheets

(56) References Cited

U.S. PATENT DOCUMENTS

| | | | | |
|---|---|---|---|---|
| 2018/0357531 | A1* | 12/2018 | Giridhari | G06N 3/0472 |
| 2020/0175119 | A1* | 6/2020 | Chung | G06F 40/289 |
| 2020/0184339 | A1* | 6/2020 | Li | G06N 3/088 |

FOREIGN PATENT DOCUMENTS

| | | |
|---|---|---|
| CN | 107239444 A | 10/2017 |
| CN | 109190126 A | 1/2019 |

OTHER PUBLICATIONS

Extended European Search Report dated Apr. 20, 2020 in European Patent Application No. 19200260.8, 10 pages.

Guthrie, D., et al., "A closer ook at skip-gram modelling", Proceedings of the 5th International Conference on Language Resources and Evaluation, May 24, 2006 (May 24, 2006) pp. 1222-1325, XP002590758.

Mnih, A., et al., "A Fast arid Simple Algorithm for Training Neural Probabllistic Language Models", Proceedings of the 29th International Confer-ence on Machine Learning, Jun. 27, 2012 (Jun. 27, 2012), XP055683289, section 2, 8 pages.

Mikolov, T., et al "Efficient Estimation of Word Representations in Vector Space", Jan. 16, 2013 (Jan. 16, 2013), XP055192736, 12 pages.

Combined Chinese Office Action and Search Report dated Oct. 19, 2022, in corresponding Chinese Patent Application No. 201910113567.2 (with English Translation), 15 pages.

* cited by examiner

METHOD AND APPARATUS BASED ON POSITION RELATION-BASED SKIP-GRAM MODEL AND STORAGE MEDIUM

CROSS-REFERENCE TO RELATED APPLICATIONS

This application is based on and claims priority to Chinese Patent Application No. 201910113567.2, filed on Feb. 14, 2019, the entire contents of which are incorporated herein by reference.

BACKGROUND

With the development of neural networks, especially deep learning, a method of learning text representation using a neural network such as a Continuous Skip-gram Model (Skip-Gram) or a Continuous Bag-of-Words Model (CBOW) has gradually become an indispensable technical means in the field of natural language processing.

The Skip-Gram model is a model for learning context information according to intermediate words. In the model training, a traditional Skip-Gram model determines positive and negative sample pairs according to a context relation between words, and input the positive and negative sample pairs into the model to perform the training. A word and a context within a certain range constitute a positive sample pair, and the word and other words beyond a certain range constitute a negative sample pair to learn a relation between words in a sentence.

With the development of language learning, however, relying on a contextual relation between words to train the Skip-Gram model, the accuracy of context prediction through the obtained Skip-Gram model is not high.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method based on a neural network model. The method includes acquiring a plurality of training samples, each of the training samples comprising an identifier of an input word, an identifier of an output word, and position information, wherein in one of the training samples, the output word is a context of the input word, and the position information indicates a relative position between the output word and the input word; calling a position relation-based Continuous Skip-gram Model (Skip-Gram), with each of the training samples as an input, to obtain an output result, the output result comprising a word matrix embedding of the input word, a word matrix embedding of the output word and a position matrix embedding of the position information; and updating the position relation-based Skip-Gram based on the output result to train the position relation-based Skip-Gram.

In an example, when acquiring the plurality of training samples, the method further includes performing sampling on a training text; performing word segmentation on the sampled training text to obtain a plurality of words; searching for an identifier of each of the plurality of words in a dictionary; selecting identifiers of two words that are within a predetermined distance range, wherein an identifier of one of the two words is selected as an identifier of the input word and an identifier of the other one of the two words is selected as an identifier of the output word; determining the first position of the output word relative to the center word and the second position of the input word relative to the center word; and generating the training samples according to the identifier of the input word, the identifier of the output word and the position information.

In another example, the position relation-based Skip-Gram comprises an input layer, a hidden layer and an output layer that are sequentially connected, the hidden layer having a weight matrix W and a bias embedding B, $W \in R^{N \times (N+M)}$, $B \in R^{N+M}$, where R represents a dictionary, N represents dimensions of a word matrix embedding of the input word and a word matrix embedding of the output word, M represents dimension of the position matrix embedding, and + represents embedding stitching.

In yet another example, when updating the position relation-based Skip-Gram based on the output result, the method further includes determining, based on the output result, a probability that the output word in the training sample appears at a position corresponding to the relative position; and updating, based on the probability, the weight matrix, the bias embedding, the word matrix embedding and the position matrix embedding of the position relation-based Skip-Gram according to a training target.

In yet another example, when updating, based on the probability, the weight matrix, the bias embedding, the word matrix embedding and the position matrix embedding of the position relation-based Skip-Gram according to the training target, the method further includes calculating a log-likelihood function according to the probability that the output word in the training sample appears at the position corresponding to the relative position; and updating, by taking maximization of the log-likelihood function as the training target, the weight matrix, the bias embedding, the word matrix embedding and the position matrix embedding of the position relation-based Skip-Gram.

In yet another example, when calculating the log-likelihood function according to the probability that the output word in the training sample appears at the position corresponding to the relative position, the method further includes calculating the log-likelihood function by using the following formula:

$$\frac{1}{T}\sum_{t=1}^{T}\sum_{i=-c, i \neq 0}^{c}\left[\ln p(w_t | w_{t+i}, pos_i) - \sum_{j=1}^{n} p(w_t | w_j, pos_{c+1})\right];$$

where $(w_{t+i}, w_t, pos_i)$ is a positive sample, $(w_j, w_t, pos_{c+1})$ is a negative sample, T is a number of training samples, t is a serial number of an identifier of an output word, $w_t$ is an identifier of a $t^{th}$ output word, 2c is a size of a context window of an output word, −c and c respectively represent positions of two ends in the context window, c+1 represents a position outside the context window, the position of $w_t$ within the context window of the identifier of the $t^{th}$ output word is 0, the position of $w_{t+i}$ within the context window of the identifier of the $t^{th}$ output word is i, $pos_i$ represents a position of $w_{t+i}$ relative to $w_t$, n is a number of negative samples in a training sample using $w_t$ as the identifier of the output word, $w_j$ is an identifier of an input word in a $j^{th}$ negative sample in the training sample using $w_t$ as the identifier of the output word, $pos_{c+1}$ represents a position of $w_j$ relative to $w_t$, ln represents a log function having a base e, $p(w_t | w_{t+i}, pos_t)$ is a probability that an identifier of an output word at a position corresponding to $pos_i$ is $w_t$ when the identifier of the input word is $w_{t+i}$, and $p(w_t|w_j,pos_{c+1})$ is a probability that an identifier of an output word at a position corresponding to $pos_{c+1}$ is $w_t$ when the identifier of the input word is $w_j$, where $$p(w_t \mid w_{t+i}, pos_i) = \frac{\exp\left(\left(\vec{w_t^T} \bullet W + B\right) \bullet \left(\overrightarrow{w_{t+i}} + \overrightarrow{pos_i}\right)\right)}{\sum_{k=1}^{n} \exp\left(\left(\vec{w_k^T} \bullet W + B\right) \bullet \left(\overrightarrow{w_{t+i}} + \overrightarrow{pos_i}\right)\right) + \exp\left(\left(\vec{w_t^T} \bullet W + B\right) \bullet \left(\overrightarrow{w_{t+i}} + \overrightarrow{pos_i}\right)\right)};$$

$$p(w_t \mid w_j, pos_{c+1}) = \frac{\exp\left(\left(\vec{w_t^T} \bullet W + B\right) \bullet \left(\overrightarrow{w_j} + \overrightarrow{pos_{c+1}}\right)\right)}{\sum_{k=1}^{n} \exp\left(\left(\vec{w_k^T} \bullet W + B\right) \bullet \left(\overrightarrow{w_j} + \overrightarrow{pos_{c+1}}\right)\right) + \exp\left(\left(\vec{w_t^T} \bullet W + B\right) \bullet \left(\overrightarrow{w_j} + \overrightarrow{pos_{c+1}}\right)\right)};$$

exp represents an exponential function having a base e; $\vec{w_k}^T$ is a transposed matrix of $\vec{w_k}$, $\vec{w_k}$ is a word matrix embedding of a input word corresponding to $w_k$, and $w_k$ represents an identifier of an input word in any negative sample; $\vec{w_{t+i}}^T$ is a transposed matrix of $\vec{w_{t+i}}$, $\vec{w_{t+i}}$ is a word matrix embedding of a input word corresponding to $w_{t+i}$, $\overrightarrow{pos_i}$ is a position matrix embedding corresponding to $pos_i$; $\vec{w_j}^T$ is a transposed matrix of $\vec{w_j}$, $\vec{w_j}$ is a word matrix embedding of a input word corresponding to $w_j$, $\overrightarrow{pos_{c+1}}$ is a position matrix embedding corresponding to $pos_{c+1}$; and ● represents matrix point multiplication.

In yet another example, when updating, by taking the maximization of the log-likelihood function as the training target, the weight matrix, the bias embedding, the word matrix embedding and the position matrix embedding of the position relation-based Skip-Gram, the method further includes updating, using a stochastic gradient descent learning algorithm, the weight matrix, the bias embedding, the word matrix embedding and the position matrix embedding of the position relation-based Skip-Gram.

According to an aspect, the method further includes acquiring a word to be predicted; and calling the trained position relation-based Continuous Skip-Gram to predict a context of the word to be predicted.

Aspects of the disclosure also provide an apparatus based on a neural network model. The apparatus includes a processor and a memory configured to store instructions executable by the processor. The processor is configured to acquire a plurality of training samples, each of the training samples comprising an identifier of an input word, an identifier of an output word, and position information, wherein in one of the training samples, the output word is a context of the input word, and the position information indicates a relative position between the output word and the input word; call a position relation-based Continuous Skip-gram Model (Skip-Gram), with each of the training samples as an input, to obtain an output result, the output result comprising a word matrix embedding of the input word, a word matrix embedding of the output word and a position matrix embedding of the position information; and update the position relation-based Skip-Gram based on the output result to train the position relation-based Skip-Gram.

Aspects of the disclosure also provide a non-transitory computer-readable storage medium having stored therein instructions that, when executed by at least one processor of an apparatus based on a neural network model, cause the apparatus to acquire a plurality of training samples, each of the training samples comprising an identifier of an input word, an identifier of an output word, and position information, wherein in one of the training samples, the output word belongs to a context of the input word, and the position information indicates a relative position of the output word and the input word; call a position relation-based Continuous Skip-gram Model (Skip-Gram), inputting each of the training samples to the position relation-based Skip-Gram to obtain an output result, the output result comprising a word matrix embedding of the input word, a word matrix embedding of the output word and a position matrix embedding of the position information; and update the position relation-based Skip-Gram based on the output result to train the position relation-based Skip-Gram.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
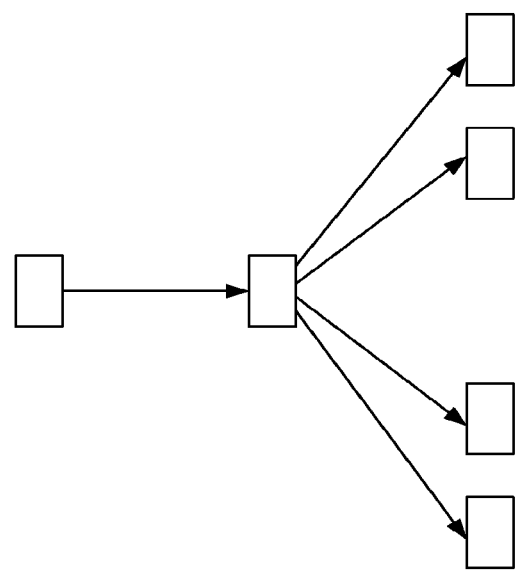
FIG. 1 is a schematic diagram of a Skip-Gram model.

FIG. 1 is a schematic diagram of a Skip-Gram model. Referring to FIG. 1, the Skip-Gram model includes an input layer, a hidden layer and an output layer. The hidden layer has a weight matrix W and a bias embedding B, $W \in R^{N \times N}$, $B \in R^N$, where R represents a dictionary, and N represents the dimensions of an identifier of an input word and an identifier of an output word.

A sample structure of a Skip-Gram model is $(w_{t-n}, w_t)$, where $w_{t-n}$ represents an identifier of an input word, $w_t$ represents an identifier of an output word, and the word corresponding to $w_t$ is a context of the word corresponding to $w_t$. The hidden layer uses the weight matrix W and the bias embedding B to implement mapping from the identifier of the input word to the identifier of the output word. The mapping manner is equivalent to: $f(x)=W \times x+B$, where x is a word matrix embedding of the input word, and $f(x)$ is a word matrix embedding of the output word. It can be seen that the Skip-Gram model is a model that learns context information $(w_{t-2n}, w_t)$ according to an intermediate word $(w_{t-n})$, and the Skip-Gram model only uses a context distance (that is, by limiting a positive sample within a certain distance) to complete the learning of the context identifier.

Figure 2:
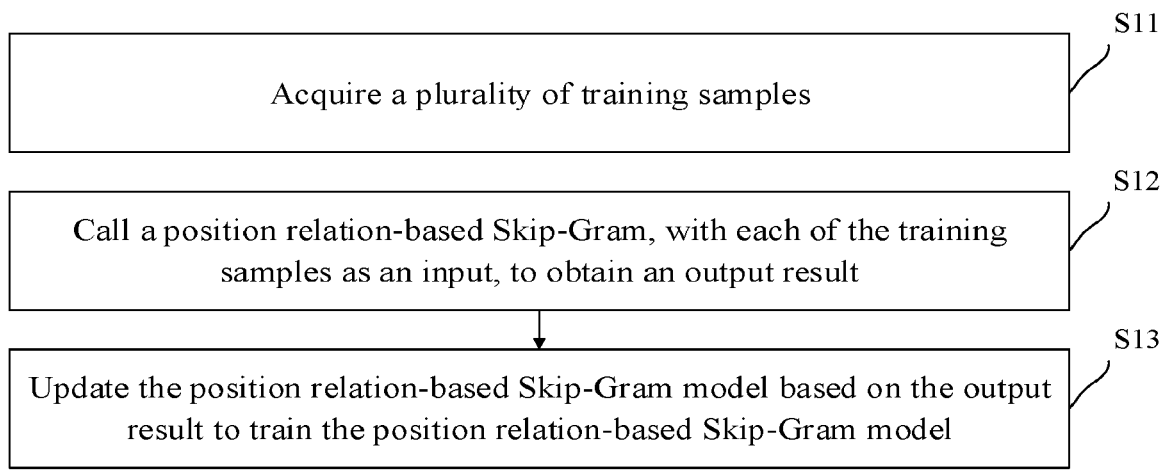
FIG. 2 is a flowchart of a method for training a neural network model according to an exemplary aspect of the present disclosure.

FIG. 2 is a flowchart of a method for training a neural network model according to an exemplary aspect. Referring to FIG. 2, the method for training the neural network model includes the following operations.

In Block S11, a plurality of training samples are acquired.

Each of the training samples includes an identifier of an input word, an identifier of an output word, and position information. In one of the training samples, the output word is a context of the input word, and the position information indicates a relative position between the output word and the input word.

The identifier of the input word may be a serial number of the input word in a dictionary. The identifier of the output word may be a serial number of the output word in the dictionary. The position information may be represented by a position identifier. For example, 1 means that the input word is the next word relative to the output word, and −1 means that the input word is the previous word relative to the output word.

In Block S12, a position relation-based Skip-Gram, with each of the training samples as an input, is called to obtain an output result, the output result including a word matrix embedding of the input word, a word matrix embedding of the output word and a position matrix embedding of the position information.

The position relation-based Skip-Gram includes an input layer, a hidden layer and an output layer that are sequentially connected. The hidden layer has a weight matrix W and a bias embedding B, $W \in R^{N \times (N+M)}$, where $B \in R^{N+M}$, where R represents a dictionary, N represents the dimensions of a word matrix embedding of the input word and a word matrix embedding of the output word, M represents the dimension of the position matrix embedding, and + represents embedding stitching.

The dimension of an embedding is the number of embedding components. Embedding stitching refers to combining two embeddings. The dimension of the combined embedding is the sum of dimensions of the original two embeddings. For example, if N is 200 dimensions and M is 100 dimensions, N+M is 300 dimensions. The combining manner may be to add an embedding behind another embedding. For example, in the present aspect, the position matrix embedding is stitched behind the word matrix embedding.

Compared with the Skip-Gram model, the position relation-based Skip-Gram considers the distance of the context of the word matrix embedding (selecting positive and negative samples through a window), and also considers a position relation of the word matrix embedding (that is, a relative position between the input word and the output word in the training sample).

The position relation here is not only the distance between the word matrix embedding and the context, but also the relative position relation between a context of the word matrix embedding and the identifier of the input word. For example, the position matrix embedding is $\overrightarrow{pos_{-1}}$, in the position matrix embedding, "−" represents that the output word is in front of the input word, and 1 represents that the distance between the output word and the input word is 1.

In Block S13, the position relation-based Skip-Gram model is updated based on the output result to train the position relation-based Skip-Gram model.

During the training process, the position relation-based Skip-Gram model calculates a probability of each output word appearing at a corresponding position according to the weight matrix and the bias embedding. According to these probability values, the update of the position relation-based Skip-Gram model can be completed.

In the aspects of the present disclosure, a position relation-based Skip-Gram model is provided. The position relation-based Skip-Gram model uses, during training, an identifier of an input word, an identifier of an output word and position information to form a training sample. The position relation-based Skip-Gram model is trained by taking maximization of a log-likelihood function as a target. Since the scheme utilizes position information, which is a relative position between an output word and an input word, the model utilizes a specific relative position relation in addition to the context, so that the effect of learning word matrix embeddings is enhanced as compared to the Skip-Gram model.

Optionally, the operation of acquiring a plurality of training samples includes: performing sampling on a training text, performing word segmentation on the sampled training text to obtain a plurality of words, and searching for an identifier of each of the plurality of words in a dictionary; selecting identifiers of two words, which are within a predetermined distance range, wherein an identifier of one of the two words is selected as an identifier of the input word and an identifier of the other one of the two words is selected as an identifier of the output word; determining the relative position between the input word and the output word to obtain the position information; and generating the training samples according to the identifier of the input word, the identifier of the output word and the position information.

In the implementation, a training text is sampled and the sampled training text is word-segmented to obtain a plurality of words, an identifier of each of the plurality of words is searched for in a dictionary, to obtain an identifier of an input word and an identifier of an output word, and position information is determined according to a position relation between the input word and the output word, so that a training sample is constituted, thereby realizing training of the position relation-based Skip-Gram model.

Optionally, the position relation-based Skip-Gram includes an input layer, a hidden layer and an output layer that are sequentially connected. The hidden layer has a weight matrix W and a bias embedding B, WE $\in R^{N \times (N+M)}$, where B $\in R^{N+M}$, represents a dictionary, N represents the dimensions of a word matrix embedding of the input word and a word matrix embedding of the output word, M represents the dimension of the position matrix embedding, and + represents embedding stitching.

In the implementation, N and M are used to represent the dimensions of a word matrix embedding and a position matrix embedding, respectively, which may be different, rather than necessarily the same, to ensure that the meaning of the position matrix embedding is more accurate. Also, the sizes of the weight matrix W and the bias embedding B are also modified correspondingly, and information of the position matrix embedding is also considered in the weight matrix W and the bias embedding B.

Optionally, the operation of updating the position relation-based Skip-Gram based on the output result includes: determining, based on the output result, a probability that an output word in the training sample appears at a corresponding position; and updating, based on the probability, a weight matrix, a bias embedding, the word matrix embedding and the position matrix embedding of the position relation-based Skip-Gram according to a training target.

In the implementation, a probability that an output word in the training sample appears at a corresponding position is first determined, and then the weight matrix and the bias embedding in the model are updated by using the probability, such that the finally trained sample can accurately predict the context of the input word.

Optionally, the operation of updating, based on the probability, a weight matrix, a bias embedding, the word matrix embedding and the position matrix embedding of the position relation-based Skip-Gram according to a training target includes: calculating a log-likelihood function according to the probability that an output word in the training sample appears at a corresponding position; and updating, by taking maximization of the log-likelihood function as the training target, a weight matrix, a bias embedding, the word matrix embedding and the position matrix embedding of the position relation-based Skip-Gram.

In the implementation, a log-likelihood function is calculated by using the probability that an output word appears at a corresponding position, and then by taking maximization of the log-likelihood function as the training target, the position relation-based Skip-Gram model is updated. On the one hand, the learning effect can be ensured. On the other hand, taking maximization of the log-likelihood function as the target is a training mode which is mature currently and easy to implement.

Optionally, the operation of calculating a log-likelihood function according to the probability that an output word in the training sample appears at a corresponding position includes: calculating the log-likelihood function by using the following formula:

$$\frac{1}{T} \sum_{t=1}^{T} \sum_{i=-c, i \neq 0}^{c} \left[ \ln p(w_t | w_{t+i}, pos_i) - \sum_{j=1}^{n} p(w_t | w_j, pos_{c+1}) \right]; \quad (1)$$

where $(w_{t+i}, w_t, pos_i)$ is a positive sample, $(w_j, w_t, pos_{c+1})$ is a negative sample, T is the number of training samples, t is a serial number of an identifier of an output word, $w_t$ is an identifier of a $t^{th}$ output word, 2c is a size of a context window of an output word, −c and c respectively represent positions of two ends in the context window, c+1 represents a position outside the context window, the position of $w_t$ within the context window of the identifier of the $t^{th}$ output word is 0, the position of $w_{t+i}$ within the context window of the identifier of the $t^{th}$ output word is i, $pos_i$ represents a position of $w_{t+i}$ relative to $w_t$, n is a number of negative samples in a training sample using $w_t$ as the identifier of the output word, $w_j$ is an identifier of an input word in a $j^{th}$ negative sample in the training sample using $w_t$ as the identifier of the output word, $pos_{c+1}$ represents a position of $w_j$ relative to $w_t$. ln represents a log function having a base e, $p(w_t | w_{t+i}, pos_i)$ is a probability that an identifier of an output word at a position corresponding to $pos_i$ is $w_i$ when the identifier of the input word is $w_{t+i}$, and $p(w_t | w_j, pos_{c+1})$ is a probability that an identifier of an output word at a position corresponding to $pos_{c+1}$ is $w_t$ when the identifier of the input word is $w_j$, where $$p(w_t | w_{t+i}, pos_i) = \frac{\exp\left(\left(\vec{w_t^T} \bullet W + B\right) \bullet \left(\vec{w_{t+i}} + \vec{pos_i}\right)\right)}{\sum_{k=1}^{n} \exp\left(\left(\vec{w_k^T} \bullet W + B\right) \bullet \left(\vec{w_{t+i}} + \vec{pos_i}\right)\right) + \exp\left(\left(\vec{w_t^T} \bullet W + B\right) \bullet \left(\vec{w_{t+i}} + \vec{pos_i}\right)\right)}; \quad (2)$$

$$p(w_t | w_j, pos_{c+1}) = \frac{\exp\left(\left(\vec{w_t^T} \bullet W + B\right) \bullet \left(\vec{w_j} + \vec{pos_{c+1}}\right)\right)}{\sum_{k=1}^{n} \exp\left(\left(\vec{w_k^T} \bullet W + B\right) \bullet \left(\vec{w_j} + \vec{pos_{c+1}}\right)\right) + \exp\left(\left(\vec{w_t^T} \bullet W + B\right) \bullet \left(\vec{w_j} + \vec{pos_{c+1}}\right)\right)};$$

exp represents an exponential function having a base e; $\vec{w_k}^T$ is a transposed matrix of $\vec{w_{t+i}}$, $\vec{w_{t+i}}$ is a word matrix embedding of a input word corresponding to $w_k$, and $w_k$ represents an identifier of an input word in any negative sample; $\vec{w_{t+i}}^T$ is a transposed matrix of $\vec{w_{t+i}}$, $\vec{w_{t+i}}$ is a word matrix embedding of a input word corresponding to $w_{t+i}$, $\vec{pos_i}$ is a position matrix embedding corresponding to $pos_i$; $\vec{w_j}^T$ is a transposed matrix of $\vec{w_j}$, $\vec{w_j}$ is a word matrix embedding of a input word corresponding to $w_j$, $\vec{pos_{c+1}}$ is a position matrix embedding corresponding to $pos_{c+1}$; and ● represents matrix point multiplication.

When the value of k in $w_k$ here ranges between 1 and n, the value of k may be the same as that of j.

In the implementation, the log-likelihood function is calculated according to the above formula, so that the log-likelihood function becomes a function related to the weight matrix W and the bias embedding B, and thus the weight matrix, the bias embedding, the word matrix embedding and the position matrix embedding can be updated by taking maximization of the log-likelihood function.

Optionally, the operation of updating, by taking maximization of the log-likelihood function as the training target, a weight matrix, a bias embedding, the word matrix embedding and the position matrix embedding of the position relation-based Skip-Gram includes: updating, using a stochastic gradient descent learning algorithm, a weight matrix, a bias embedding, the word matrix embedding and the position matrix embedding of the position relation-based Skip-Gram.

The stochastic gradient descent learning algorithm is a method used in the training process. W and B are updated by taking maximization of a log-likelihood function as a target every time training a sample, so as to obtain the optimal W and B.

In the implementation, the position relation-based Skip-Gram model is trained by using a stochastic gradient descent learning algorithm. On the one hand, the learning effect can be ensured. On the other hand, the stochastic gradient descent learning algorithm is a training mode which is mature currently and easy to implement.

It should be noted that the foregoing operations S11-S13 and the above optional operations may be arbitrarily combined.

Figure 3:
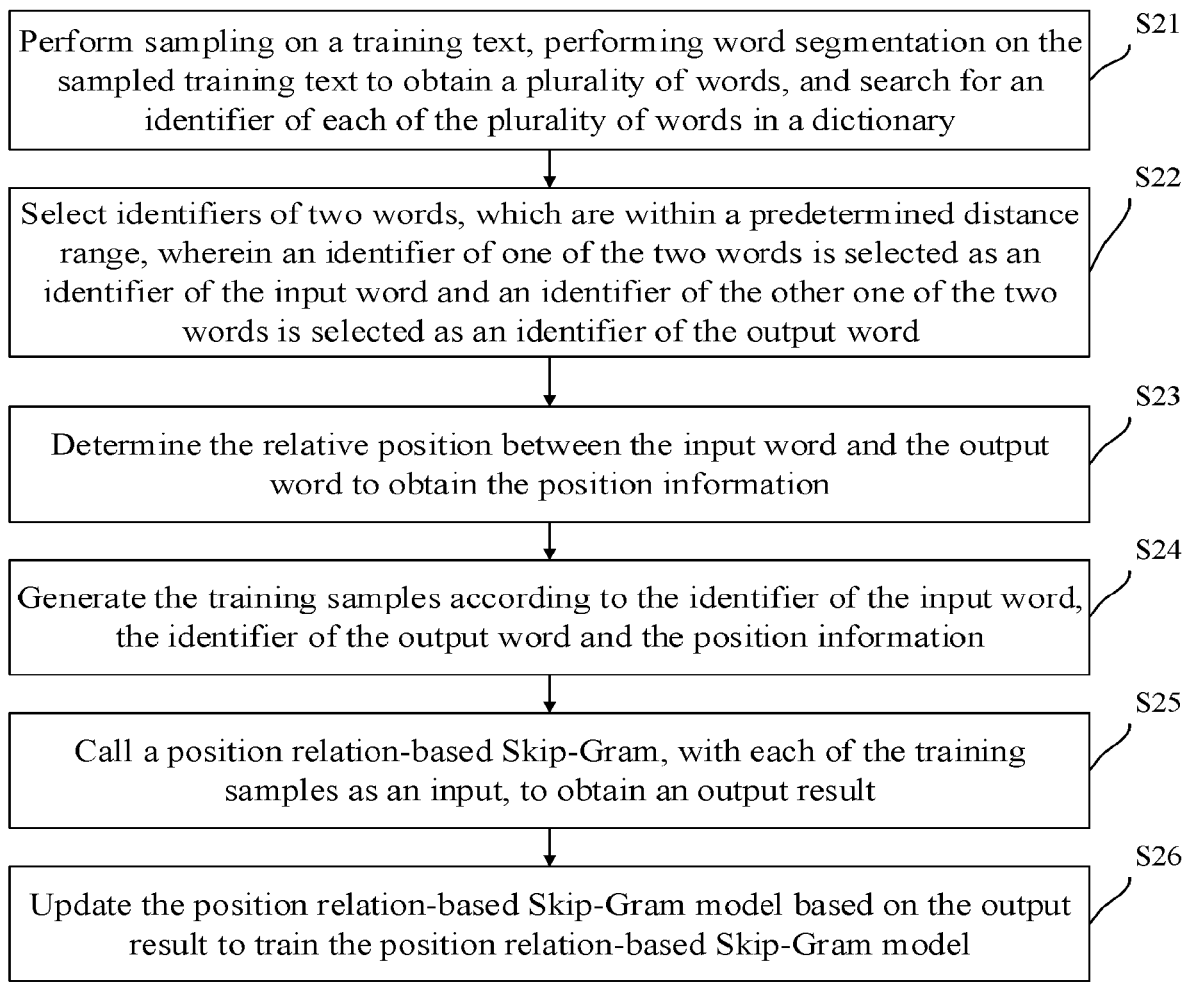
FIG. 3 is a flowchart of a method for training a neural network model according to an exemplary aspect of the present disclosure.

FIG. 3 is a flowchart of a method for training a neural network model according to an exemplary aspect. Referring to FIG. 3, the method for training the neural network model includes the following operations.

In Block S21, a training text is sampled and the sampled training text is word-segmented to obtain a plurality of words, and identifier of each of the plurality of words is searched for in a dictionary.

For example, a training text is first selected, some sentences are extracted from the training text, a word segmentation tool is used to perform word segmentation processing on the sentences, and an identifier of each word, that is, a serial number in a dictionary, is searched for in the dictionary.

In Block S22, identifiers of two words within a predetermined distance range are selected, an identifier of one of the two words is selected as an identifier of the input word and an identifier of the other one of the two words is selected as an identifier of the output word.

On the basis of Block S21, the distance refers to the distance between two words, and the predetermined distance range here is defined by the size of a context window. Two words are selected within the context window. One of the two words is selected as an input word and the other is selected as an output word. The identifier corresponding to the input word is used as an identifier of the input word and the identifier corresponding to the output word is used as an identifier of the output word. The context window refers to a certain range around the input word or the output word. The size of the context window refers to the number of words, except a center word, contained in the context window. For example, when more sentences are sampled from the training text, the size of the context window may be designed to be smaller. For example, two words are in front of and behind the output word respectively, that is, the identifier of the output word is $w_t$, so the identifier of the input word includes $W_{t-}$, $w_{t-2}$, $w_{t+1}$, and $w_{t+2}$. In this case, the size of the context window is 4. For another example, when less sentences are sampled from the training text, the size of the context window may be designed to be larger. For example, six words are in front of and behind the word matrix embedding respectively. In this case, the size of the context window is 12.

In Block S23, the relative position between the input word and the output word is determined to obtain position information.

For example, the identifier of the output word is $w_t$, the identifier of the input word is $w_{t-1}$, and the position information is $pos_{-1}$. In the position information, "–" represents that the output word is in front of the input word, and 1 represents the distance between the output word and the input word is 1.

In Block S24, the training samples are generated according to the identifier of the input word, the identifier of the output word and the position information.

Each training sample includes the identifier of the input word, the identifier of the output word, and the position information, that is, the training sample may be ($w_{t-1}$, $w_t$, $pos_{-1}$).

As an example, the size of the context window is 2c. The window range for selecting a positive sample corresponding to the position information is (−c, −c+1, . . . , c), −c to c respectively represent a distance relative to a center word in a context window, a word in the context window is defined as negative when appearing in front of a target word, the word in the context window is defined as positive when appearing behind the target word, and the word appearing in the context window and the target word constitute a positive sample. Except for the positive sample, the position of the context outside of the context window is represented by c+1, that is, a word of c+1 has no context relationship with the target word, that is, a negative sample is formed with the target word.

Since the number of negative samples is large, a certain number of negative samples can be extracted from all negative samples, which can be used to form a training sample together with the positive sample.

A plurality of training samples are acquired in the manner of operations S21-S24.

In Block S25, a position relation-based Skip-Gram, with each of the training samples as an input, is called to obtain an output result, the output result including a word matrix embedding of the input word, a word matrix embedding of the output word and a position matrix embedding of the position information.

The position relation-based Skip-Gram includes an input layer, a hidden layer and an output layer that are sequentially connected. The hidden layer has a weight matrix W and a bias embedding B, $W \in R^{N \times (N+M)}$, $B \in R^{N+M}$, where R represents a dictionary, N represents the dimensions of a word matrix embedding of the input word and a word matrix embedding of the output word, M represents the dimension of the position matrix embedding, and + represents embedding stitching.

The dimension of a embedding is the number of embedding components. Embedding stitching refers to combine two embeddings. The dimension of the combined embedding is the sum of dimensions of the original two embeddings. For example, if N is 100 dimensions and M is 200 dimensions, N+M is 300 dimensions. The combining manner may be to add a embedding behind another embedding. For example, in the present aspect, the position matrix embedding is stitched behind the word matrix embedding.

Compared with the Skip-Gram model, the position relation-based Skip-Gram considers the distance of the context of the word matrix embedding (selecting positive and negative samples through a window), and also considers a position relation between the word matrix embeddings (that is, a relative position between the input word and the output word in the training sample).

In Block S26, the position relation-based Skip-Gram model is updated based on the output result to train the position relation-based Skip-Gram model.

In the aspects of the present disclosure, Block S26 may include: determining, based on the output result, a probability that an output word in the training sample appears at a corresponding position; and updating, based on the probability, a weight matrix, a bias embedding, the word matrix embedding and the position matrix embedding of the position relation-based Skip-Gram according to a training target.

In the aspects of the present disclosure, the operation of updating, based on the probability, a weight matrix, a bias embedding, the word matrix embedding and the position matrix embedding of the position relation-based Skip-Gram according to a training target includes: calculating a log-likelihood function according to the probability that an output word in the training sample appears at a corresponding position; and updating, by taking maximization of the log-likelihood function (or referred to as minimizing a negative log-likelihood function) as the training target, a weight matrix, a bias embedding, the word matrix embedding and the position matrix embedding of the position relation-based Skip-Gram.

The log-likelihood function may be calculated by using the following formula:

$$\frac{1}{T}\sum_{t=1}^{T}\sum_{i=-c, i\neq 0}^{c}\left[lnp(w_t \mid w_{t+i}, pos_i) - \sum_{j=1}^{n} p(w_t \mid w_j, pos_{c+1})\right];$$

where $(w_{t+i}, w_t, pos_i)$ is a positive sample, $(w_j, w_t, pos_{c+1})$, is a negative sample, T is the number of training samples, t is a serial number of an identifier of an output word, $w_t$ is an identifier of a $t^{th}$ output word, 2c is a size of a context window of an output word, −c and c respectively represent positions of two ends in the context window, c+1 represents a position outside the context window, the position of $w_t$ within the context window of the identifier of the $t^{th}$ output word is 0, the position of $w_{t+i}$ within the context window of the identifier of the $t^{th}$ output word is i, $pos_i$ represents a position of $w_{t+i}$ relative to $w_t$, n is a number of negative samples in a training sample using $w_t$ as the identifier of the output word, $w_j$ is an identifier of an input word in a $j^{th}$ negative sample in the training sample using $w_t$ as the identifier of the output word, $pos_{c+1}$ represents a position of $w_j$ relative to $w_t$, ln represents a log function having a base e, $p(w_t|w_{t+i}, pos_i)$ is a probability that an identifier of an output word at a position corresponding to $pos_i$ is $w_t$ when the identifier of the input word is $w_{t+i}$, and $p(w_t|w_j, pos_{c+1})$ is a probability that an identifier of an output word at a position corresponding to $pos_{c+1}$, is $w_t$ when the identifier of the input word is $w_j$, where $$p(w_t \mid w_{t+i}, pos_i) = \frac{\exp\left(\left(\vec{w_t^T}\bullet W + B\right)\bullet(\vec{w_{t+i}} + \vec{pos_i})\right)}{\sum_{k=1}^{n}\exp\left(\left(\vec{w_k^T}\bullet W + B\right)\bullet(\vec{w_{t+i}} + \vec{pos_i})\right) + \exp\left(\left(\vec{w_t^T}\bullet W + B\right)\bullet(\vec{w_{t+i}} + \vec{pos_i})\right)};$$

-continued $$p(w_t \mid w_j, pos_{c+1}) = \frac{\exp\left(\left(\vec{w_t^T}\bullet W + B\right)\bullet(\vec{w_j} + \vec{pos_{c+1}})\right)}{\sum_{k=1}^{n}\exp\left(\left(\vec{w_k^T}\bullet W + B\right)\bullet(\vec{w_j} + \vec{pos_{c+1}})\right) + \exp\left(\left(\vec{w_t^T}\bullet W + B\right)\bullet(\vec{w_j} + \vec{pos_{c+1}})\right)};$$

exp represents an exponential function having a base e; $\vec{w_k^T}$ is a transposed matrix of $\vec{w_k}$, $\vec{w_k}$ is a word matrix embedding of a input word corresponding to $w_k$, and $w_k$ represents an identifier of an input word in any negative sample; $\vec{w_{t+i}^T}$ is a transposed matrix of $\vec{w_{t+i}}$, $\vec{w_{t+i}}$ is a word matrix embedding of a input word corresponding to $w_{t+i}$, $\vec{pos_i}$ is a position matrix embedding corresponding to $pos_i$; $\vec{w_j^T}$ is a transposed matrix of $\vec{w_j}$, $\vec{w_j}$ is a word matrix embedding of a input word corresponding to $w_j$, $\vec{pos_{c+1}}$ is a position matrix embedding corresponding to $pos_{c+1}$, and ● represents matrix point multiplication.

The log-likelihood function is calculated according to the above formula, so that the log-likelihood function becomes a function related to the weight matrix W and the bias embedding B, and thus the weight matrix, the bias embedding, the word matrix embedding and the position matrix embedding can be updated by maximizing the log-likelihood function.

Formula (2) is a formula used to determining a probability formula of an output word in a training sample appearing at a corresponding position. The probability of an output word in a training sample appearing at a corresponding position can be calculated according to the formula (2).

In $p(w_t|w_{t+i}, pos_i)$ $w_j$ is an matrix having N-row and one-column, so $w_j^T$ is a matrix having one-row and N-column, W is a matrix having N-row and (N+M)-column, and $_j^T$●W obtained by multiplication is a matrix having one-row and (N+M)-column; B is a matrix having one-row and (N+M)-column, so $(w_j^T$●W+B) obtained by matrix addition is a matrix having one-row and (N+M)-column; $w_j$ is an N-dimension embedding, and $pos_i$ is an M-dimension embedding, so $(w_{t+i}, +pos_i)$ obtained by embedding stitching is an (N+M)-dimension embedding, that is, a matrix having (N+M)-row and one-column. Since the number of the columns of $(w_j^T$●W+B) is the same as the number of the rows of $(w_{t+i}+pos_i)$ point multiplication can be performed.

Optionally, the operation of updating, by taking maximization of the log-likelihood function as the training target, a weight matrix, a bias embedding, the word matrix embedding and the position matrix embedding of the position relation-based Skip-Gram includes: updating, using a stochastic gradient descent learning algorithm, a weight matrix, a bias embedding, the word matrix embedding and the position matrix embedding of the position relation-based Skip-Gram.

The stochastic gradient descent learning algorithm is a method used in the training process. In the aspects of the present disclosure, in addition to the stochastic gradient descent learning algorithm, other algorithms, such as a fastest gradient descent learning algorithm, may be used for training.

In addition, in the aspects of the present disclosure, maximizing the log-likelihood function is only an implementation of the training target, and of course, other training targets may be used for model training.

Figure 4:
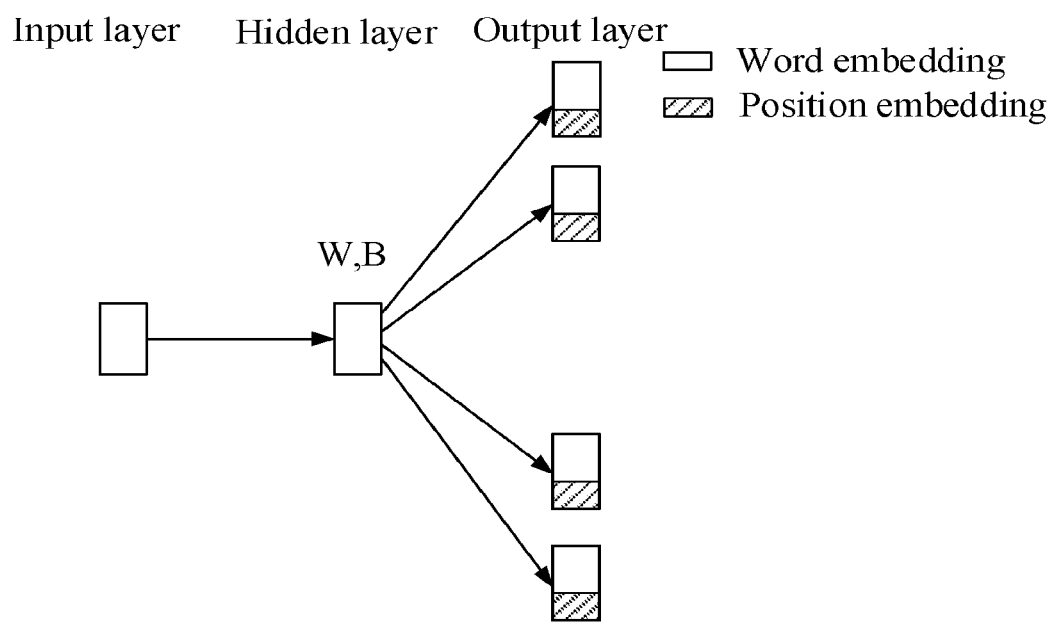
FIG. 4 is an algorithm model diagram of a position relation-based Skip-Gram according to an exemplary aspect of the present disclosure.

FIG. 4 is an algorithm model diagram of a position relation-based Skip-Gram according to an exemplary aspect. Referring to FIG. 4, the blank portion represents a word matrix embedding, and the shaded portion represents a position matrix embedding. In the method proposed by the present disclosure, the dimension of the word matrix embedding is different from the dimension of the position matrix embedding dimension, the dimension of the word matrix embedding is usually larger, and the dimension of the position matrix embedding is usually smaller. The two dimensions are different, thereby ensuring that the size of a position space embedding is substantially recreated.

Figure 5:
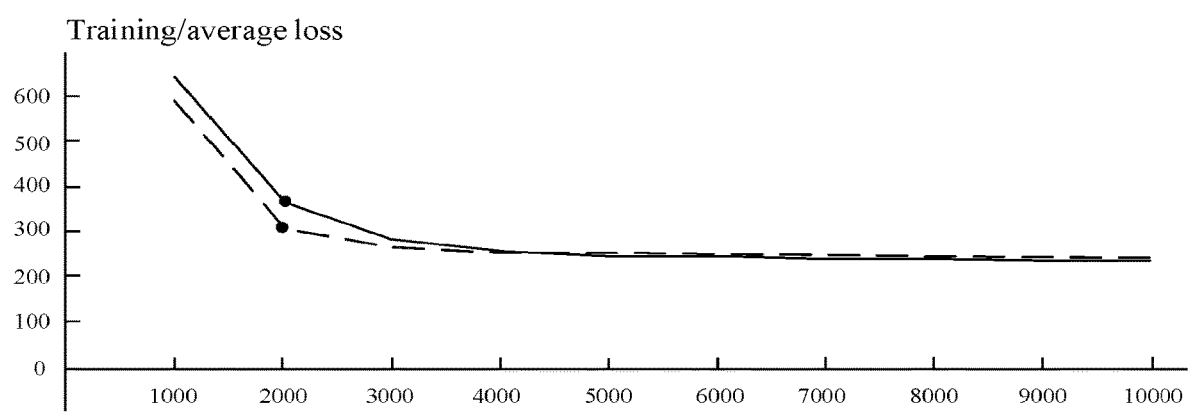
FIG. 5 is a schematic diagram showing a loss change of a neural network model according to an exemplary aspect of the present disclosure.
Figure 6:
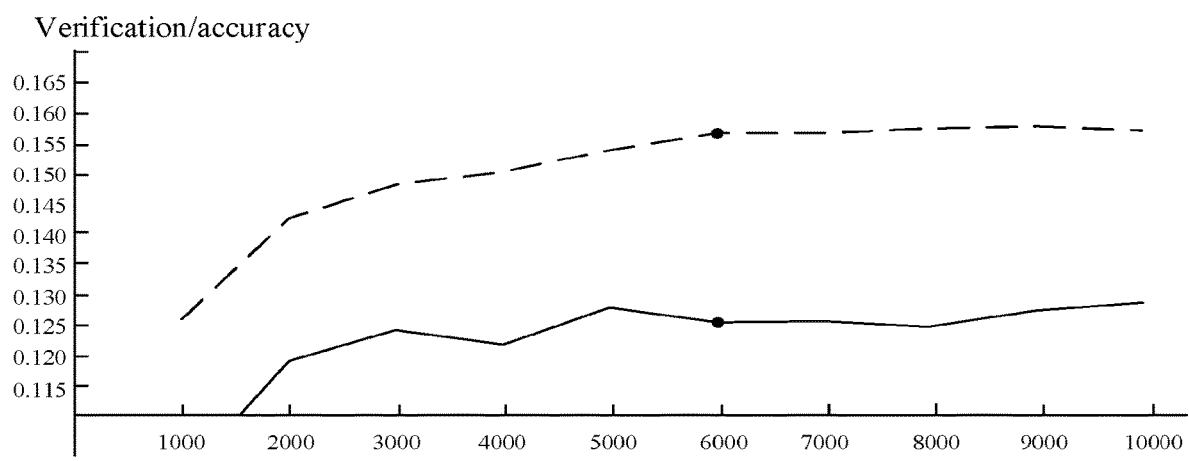
FIG. 6 is a curve diagram showing an accuracy change of a neural network model according to an exemplary aspect of the present disclosure.

FIG. 5 is a schematic diagram showing a loss change of a neural network model according to an exemplary aspect. FIG. 6 is a curve diagram showing an accuracy change of a neural network model according to an exemplary aspect. Referring to FIG. 5 and FIG. 6, databases in a word similarity task and an analogical reasoning task in a public test set are used to compare the effects of the model. A penn treebank is used as a training set firstly, a men dataset and WordSim353 are used as a verification set to perform contrast experiments, and the experimental results are shown in FIG. 5 and FIG. 6.

FIG. 5 is loss change curves of a Position-Wise Skip-Gram (PWSG) and an existing naivesg model (a Skip-Gram model). FIG. 6 is accuracy change curves of a PWSG model and a naivesg model. In the PWSG model, the dimension of the word matrix embedding is 256, the dimension of the position matrix embedding is 100, the context window is 4 (that is, previous two words and next two words relative to a current word are taken as the context), the batch size during training is 256, the number of sampling the negative sample is 5, the ratio of a training set to a verification set is 4:1, and the epoch size is 10 rounds; the dotted line represents the PWSG model provided by the present disclosure, and the solid line represents the naivesg model. An epoch is a process of a forward pass and reverse pass for all training samples.

During the training process, it can be seen from FIG. 5 that the PWSG model can reach a stable state more quickly than the naivesg model when training with the training set, that is, the PWSG model provided by the present application converges faster than the naivesg model. It can be seen from FIG. 6 that the accuracy of the PWSG model is significantly higher than that of the naivesg model when the verification set is used for verification, that is, the accuracy of the PW SG model provided by the present application is higher than that of the naivesg model.

After the training is completed, on the men dataset and WordSim353, the word matrix embedding effect is verified in a pairwise manner, that is, which one of an A-B word pair and a C-D word pair is more similar, and the accuracy is as follows:

|  | PWSG | Naïvesg |
|---|---|---|
| MEN dataset | 0.80727 | 0.80126 |
| Wordsim353 | 0.79648 | 0.77991 |

It can be seen that the accuracy of the PWSG model provided by the present disclosure is higher than that of the Naivesg model after the training is completed.

In the present disclosure, based on a Skip-Gram model framework, position information is integrated, wherein the position information is converted into a position matrix embedding during the training process, it is not limited that the dimension of the word matrix embedding and the dimension of the position matrix embedding are the same, and the integration mode does not use a Hadamard product of the word matrix embedding and the position matrix embedding, but the position matrix embedding is modeled separately. The position information is better utilized by embedding stitching, and good effects are achieved on both the verification set and the public test set.

Figure 7:
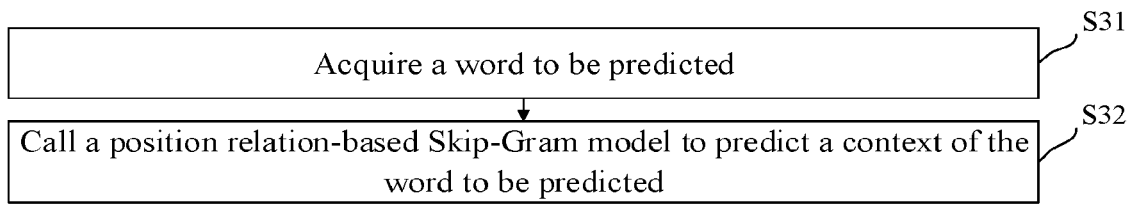
FIG. 7 is a flowchart of a context prediction method according to an exemplary aspect of the present disclosure.

FIG. 7 is a flowchart of a context prediction method according to an exemplary aspect. Referring to FIG. 7, the method includes the following operations:

Block S31: Acquire a word to be predicted.

Block S32: Call a position relation-based Skip-Gram model to predict a context of the word to be predicted, the position relation-based Skip-Gram model being trained using the method shown in FIG. 2 or FIG. 3.

It is worth noting that the word to be predicted may be embedding-converted by an embedding conversion tool to obtain a word matrix embedding, and then the position relation-based Skip-Gram model is called to predict the context of the word to be predicted.

Figure 8:
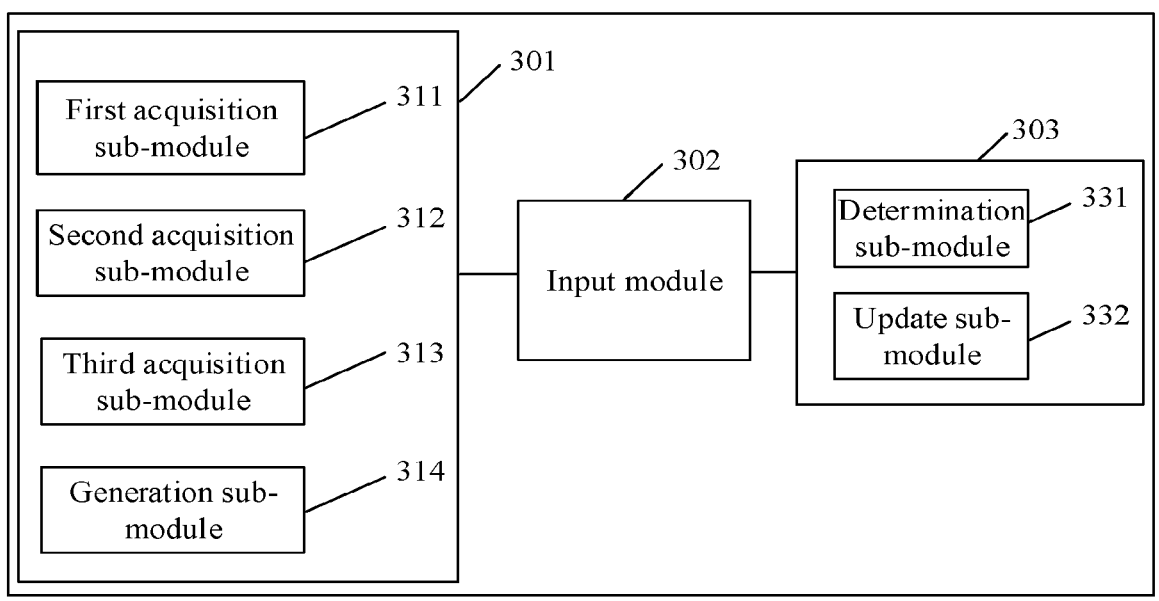
FIG. 8 is a block diagram of an apparatus for training a neural network model according to an exemplary aspect of the present disclosure.

FIG. 8 is a block diagram of an apparatus for training a neural network model according to an exemplary aspect. Referring to FIG. 8, the neural network model training apparatus includes: an acquisition module 301, an input module 302 and a training module 303.

The acquisition module 301 is configured to acquire a plurality of training samples, each of the training samples including an identifier of an input word, an identifier of an output word, and position information. In one of the training samples, the output word is a context of the input word, and the position information indicates a relative position between the output word and the input word. The input module 302 is configured to call a position relation-based Skip-Gram, with each of the training samples as an input, to obtain an output result, the output result including a word matrix embedding of the input word, a word matrix embedding of the output word and a position matrix embedding of the position information. The training module 303 is configured to update the position relation-based Skip-Gram based on the output result to train the position relation-based Skip-Gram.

In an implementation of the present disclosure, the acquisition module 301 includes a first acquisition sub-module 311, a second acquisition sub-module 312, a third acquisition sub-module 313 and a generation sub-module 314.

The first acquisition sub-module 311 is configured to perform sampling on a training text, performing word segmentation on the sampled training text to obtain a plurality of words, and search for an identifier of each of the plurality of words in a dictionary.

The second acquisition sub-module 312 is configured to select identifiers of two words, which are within a predetermined distance range, herein an identifier of one of the two words is selected as an identifier of the input word and an identifier of the other one of the two words is selected as an identifier of the output word.

The third acquisition sub-module 313 is configured to determine the relative position between the input word and the output word to obtain the position information.

The generation sub-module 314 is configured to generate the training samples according to the identifier of the input word, the identifier of the output word and the position information.

In an implementation of the present disclosure, the position relation-based Skip-Gram includes an input layer, a hidden layer and an output layer that are sequentially connected. The hidden layer has a weight matrix W and a bias embedding B, W $\in R^{N \times (N+M)}$, B $\in R^{N+M}$, where R represents a dictionary, N represents the dimensions of a word matrix embedding of the input word and a word matrix embedding of the output word, M represents the dimension of the position matrix embedding, and + represents embedding stitching.

In an implementation of the present disclosure, the training module 303 includes a determination sub-module 331 and an update sub-module 332.

The determination sub-module 331 is configured to determine, based on the output result, a probability that an output word in the training sample appears at a position corresponding to the relative position.

The update sub-module 332 is configured to update, based on the probability, a weight matrix, a bias embedding, the word matrix embedding and the position matrix embedding of the position relation-based Skip-Gram according to a training target.

In an implementation of the present disclosure, the update sub-module 332 is configured to: calculate a log-likelihood function according to the probability that an output word in the training sample appears at a position corresponding to the relative position; and update, by taking maximization of the log-likelihood function as the training target, a weight matrix, a bias embedding, the word matrix embedding and the position matrix embedding of the position relation-based Skip-Gram.

In an implementation of the present disclosure, the update sub-module 332 is configured to calculate the log-likelihood function by using the following formula:

$$\frac{1}{T}\sum_{t=1}^{T}\sum_{i=-c, i \neq 0}^{c}\left[\ln p(w_t | w_{t+i}, pos_i) - \sum_{j=1}^{n} p(w_t | w_j, pos_{c+1})\right];$$

where ($w_{t+i}$, $w_t$, $pos_i$) is a positive sample, ($w_j$, $w_t$, $pos_{c+1}$) is a negative sample, T is the number of training samples, t is a serial number of an identifier of an output word, $w_t$ is an identifier of a $t^{th}$ output word, 2c is a size of a context window of an output word, −c and c respectively represent positions of two ends in the context window, c+1 represents a position outside the context window, the position of $w_t$ within the context window of the identifier of the $t^{th}$ output word is 0, the position of $w_t$ within the context window of the identifier of the $t^{th}$ output word is i, $pos$ represents a position of $w_{t+i}$ relative to $w_t$, n is a number of negative samples in a training sample using $w_t$ as the identifier of the output word, $w_j$ is an identifier of an input word in a $j^{th}$ negative sample in the training sample using $w_t$ as the identifier of the output word, $pos_{c+1}$ represents a position of $w_j$ relative to $w_t$, ln represents a log function having a base e, $p(w_t|w_{t+i}, pos_i)$ is a probability that an identifier of an output word at a position corresponding to $pos_i$ is $w_t$ when the identifier of the input word is $w_{t+i}$, and $p(w_t|w_j, pos_{c+1})$ is a probability that an identifier of an output word at a position corresponding to $pos_{c+1}$ is $w_t$ when the identifier of the input word is $w_j$, where $$p(w_t | w_{t+i}, pos_i) = \frac{\exp\left(\left(\overrightarrow{w_t^T} \bullet W + B\right) \bullet (\overrightarrow{w_{t+i}} + \overrightarrow{pos_i})\right)}{\sum_{k=1}^{n}\exp\left(\left(\overrightarrow{w_k^T} \bullet W + B\right) \bullet (\overrightarrow{w_{t+i}} + \overrightarrow{pos_i})\right) + \exp\left(\left(\overrightarrow{w_t^T} \bullet W + B\right) \bullet (\overrightarrow{w_{t+i}} + \overrightarrow{pos_i})\right)};$$

$$p(w_t | w_j, pos_{c+1}) = \frac{\exp\left(\left(\overrightarrow{w_t^T} \bullet W + B\right) \bullet (\overrightarrow{w_j} + \overrightarrow{pos_{c+1}})\right)}{\sum_{k=1}^{n}\exp\left(\left(\overrightarrow{w_k^T} \bullet W + B\right) \bullet (\overrightarrow{w_j} + \overrightarrow{pos_{c+1}})\right) + \exp\left(\left(\overrightarrow{w_t^T} \bullet W + B\right) \bullet (\overrightarrow{w_j} + \overrightarrow{pos_{c+1}})\right)};$$

exp represents an exponential function having a base e; $\overrightarrow{w_k^T}$ is a transposed matrix $\overrightarrow{w_k}$, $\overrightarrow{w_k}$ is a word matrix embedding of a input word corresponding to $w_k$, and $w_k$ represents an identifier of an input word in any negative sample; $\overrightarrow{w_{t+i}^T}$ is a transposed matrix of $\overrightarrow{w_{t+i}}$, $\overrightarrow{w_{t+i}}$ is a word matrix embedding of a input word corresponding to $w_{t+i}$, $\overrightarrow{pos_i}$ is a position matrix embedding corresponding to $pos_i$; $\overrightarrow{w_j^T}$ is a transposed matrix of $\overrightarrow{w_j}$, $\overrightarrow{w_j}$ is a word matrix embedding of a input word corresponding to $w_j$, $\overrightarrow{pos_{c+1}}$ is a position matrix embedding corresponding to $pos_{c+1}$; and ● represents matrix point multiplication.

In an implementation of the present disclosure, the update sub-module 332 is configured to update, using a stochastic gradient descent learning algorithm, a weight matrix, a bias embedding, the word matrix embedding and the position matrix embedding of the position relation-based Skip-Gram.

The manner in which the acquisition module 301 acquires training samples may refer to operations S21-S24. The manner in which the input module 302 inputs the training samples to a Skip-Gram model may refer to Block S25. The manner in which the training module 303 updates the position relation-based Skip-Gram may refer to Block S26. Detailed description is omitted here.

Figure 9:
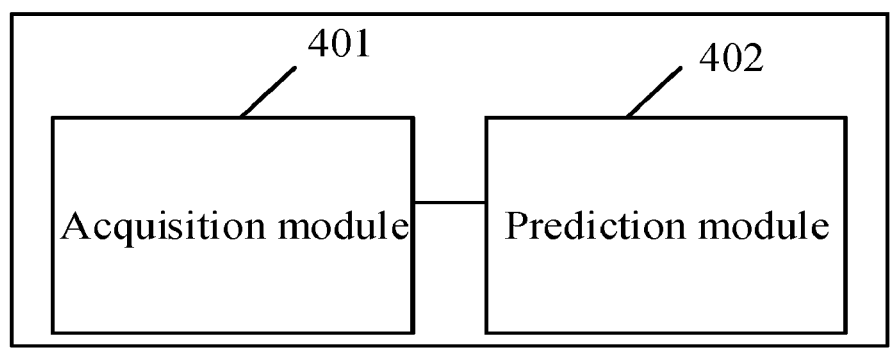
FIG. 9 is a block diagram of an apparatus for predicting a context according to an exemplary aspect of the present disclosure.

FIG. 9 is a block diagram of an apparatus for predicting a context according to an exemplary aspect. Referring to FIG. 9, the context prediction apparatus includes: an acquisition module 401 and a prediction module 402.

The acquisition module 401 is configured to acquire a word to be predicted. The prediction module 402 configured to call a position relation-based Skip-Gram model to predict a context of the word to be predicted, the position relation-based Skip-Gram model being trained using the method in FIG. 2 or FIG. 3.

The manner in which the acquisition module 401 acquires a word to be predicted may refer to Block S31. The manner in which the prediction module 402 predicts a context of the word to be predicted may refer to Block S32. Detailed description is omitted here.

Figure 10:
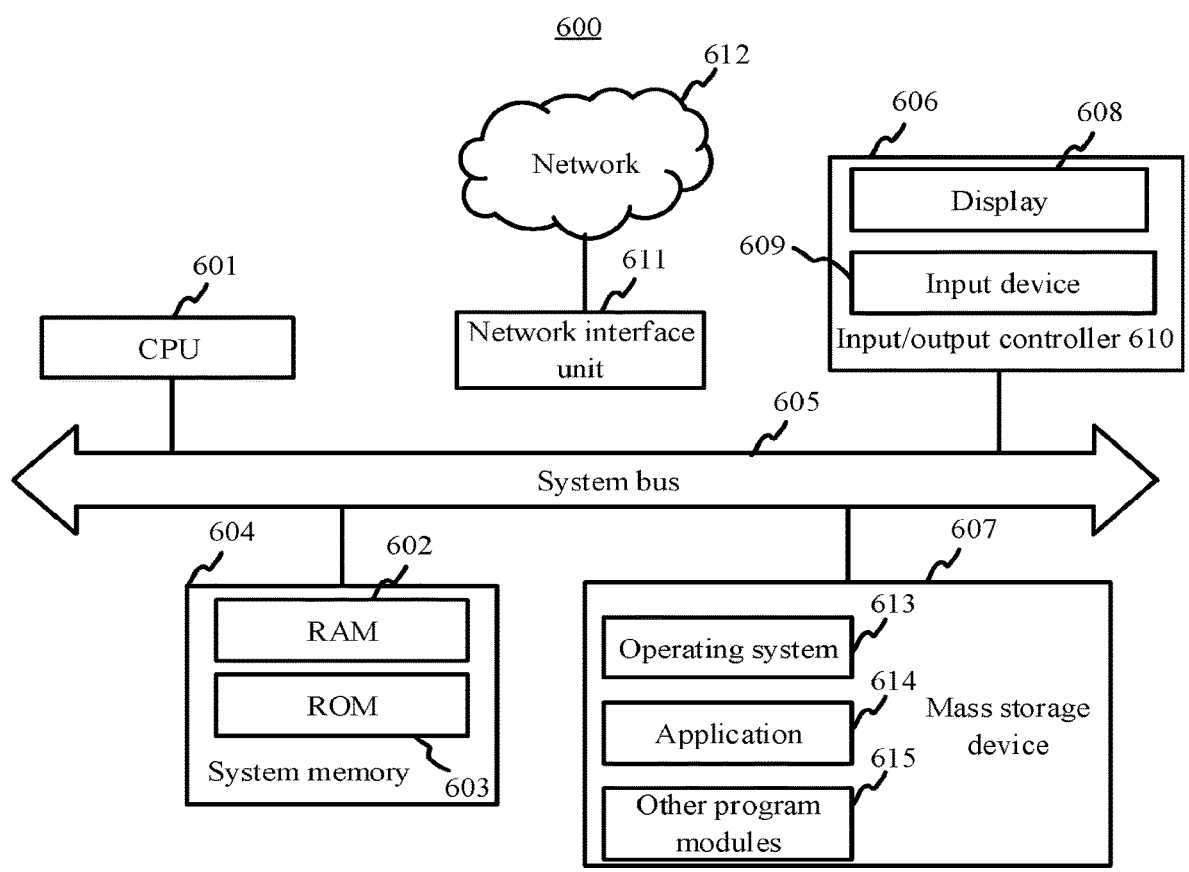
FIG. 10 is a block diagram of an apparatus for training a neural network model or an apparatus for predicting a context according to an exemplary aspect of the present disclosure.

FIG. 10 is a block diagram of a neural network model training/context prediction apparatus 600 according to an exemplary aspect. The apparatus 600 may be a server. Referring to FIG. 10, the neural network model training apparatus 600 may include a Central Processing Unit (CPU) 601, a system memory 604 including a Random Access Memory (RAM) 602 and a Read Only Memory (ROM) 603, and a system bus 605 connecting the system memory 604 and the CPU 601. The server 600 further includes a basic Input/Output system (I/O system) 606 that facilitates transfer of information between various devices in a computer, and a mass storage device 607 for storing an operating system 613, applications 614 and other program modules 615.

The basic I/O system 606 includes a display 608 for displaying information and an input device 609 such as a mouse or a keyboard for user input of information. Both the display 608 and the input device 609 are connected to the CPU 601 via an input output controller 610 that is connected to the system bus 605. The basic I/O system 606 may further include an input and output controller 610 for receiving and processing input from a keyboard, a mouse, a plurality of other devices such as an electronic stylus. Similarly, the input and output controller 610 also provides output to a display screen, a printer, or other types of output devices.

The mass storage device 607 is connected to the CPU 601 via a mass storage controller (not shown) connected to the system bus 605. The mass storage device 607 and its associated computer-readable medium provide non-volatile storage for the server 600. That is, the mass storage device 607 may include a computer-readable medium (not shown) such as a hard disk or a CD-ROM drive.

Without loss of generality, the computer-readable medium may include a computer storage medium and a communication medium. The computer storage medium includes volatile and nonvolatile, removable and non-removable media implemented in any method or technology for storing information such as computer-readable instructions, data structures, program modules or other data. The computer storage medium includes a RAM, a ROM, an Erasable Programmable Read-Only Memory (EPROM), an Electrically Erasable Programmable Read-Only Memory (EEPROM), a flash memory or other solid state storage technologies, a CD-ROM, a DVD or other optical storages, a tape cartridge, a magnetic tape, magnetic disk storage or other magnetic storage devices. Of course, those skilled in the art will appreciate that the computer storage medium is not limited to the above. The system memory 604 and the mass storage device 607 described above may be collectively referred to as a memory.

According to various aspects of the disclosure, the server 600 may also be operated by a remote computer connected to a network through a network such as the Internet. That is, the server 600 may be connected to a network 612 through a network interface unit 611 connected to the system bus 605, or may also be connected to other types of networks or remote computer systems (not shown) using the network interface unit 611.

The memory further includes one or more programs, the one or more programs being stored in a memory. The CPU 601 implements the method for training the neural network model shown in FIG. 2 or FIG. 3 by executing the one or more programs, or implements the context prediction method shown in FIG. 7 by executing the one or more programs.

In exemplary aspects, there is al so provided a non-transitory computer-readable storage medium, such as an memory including instructions, the instructions can be executed by the processor of the server, to perform the neural network model training/context prediction method shown in various aspects of the disclosure. For example, the non-transitory computer-readable storage medium may be a ROM, a random access memory (RAM), a CD-ROM, a magnetic tape, a floppy disc, an optical data storage device, and the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the present disclosure disclosed here. This application is intended to cover any variations, uses, or adaptations of the present disclosure following the general principles thereof and including such not disclosed in the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope of the present disclosure. It is intended that the scope of the present disclosure only be limited by the appended claims.

What is claimed is:

1. A method based on a neural network model, comprising:
　acquiring a plurality of training samples, each of the training samples comprising an identifier of an input word, an identifier of an output word, and position information, wherein in one of the training samples, the output word is a context of the input word, and the position information indicates a relative position between the output word and the input word;
　calling a position relation-based Continuous Skip-gram Model (Skip-Gram), with each of the training samples as an input, to obtain an output result, the output result comprising a word matrix embedding of the input word, a word matrix embedding of the output word and a position matrix embedding of the position information, wherein the position relation-based Skip-Gram comprises an input layer, a hidden layer and an output layer that are sequentially connected, the hidden layer having a weight matrix W and a bias embedding B, W $\in R^{N \times (N+M)}$, B $\in R^{N+M}$, where R represents a dictionary, N represents dimensions of a word matrix embedding of the input word and a word matrix embedding of the output word, M represents dimension of the position matrix embedding, and + represents embedding concatenation; and
　updating the position relation-based Skip-Grain based on the output result to train the position relation-based Skip-Gram.

2. The method of claim 1, wherein acquiring the plurality of training samples comprises:
　performing sampling on a training text;
　performing word segmentation on the sampled training text to obtain a plurality of words;
　searching for an identifier of each of the plurality of words in a dictionary;
　selecting identifiers of two words that are within a predetermined distance range, wherein an identifier of one of the two words is selected as an identifier of the input word and an identifier of the other one of the two words is selected as an identifier of the output word;
　determining the first position of the output word relative to the center word and the second position of the input word relative to the center word; and generating the training samples according to the identifier of the input word, the identifier of the output word and the position information.

3. The method of claim 1, wherein updating the position relation-based Skip-Gram based on the output result comprises:

determining, based on the output result, a probability that the output word in the training sample appears at a position corresponding to the relative position; and updating, based on the probability, the weight matrix, the bias embedding, the word matrix embedding and the position matrix embedding of the position relation-based Skip-Gram according to a training target.

4. The method of claim 3, wherein updating, based on the probability, the weight matrix, the bias embedding, the word matrix embedding and the position matrix embedding of the position relation-based Skip-Gram according to the training target comprises:

calculating a log-likelihood function according to the probability that the output word in the training sample appears at the position corresponding to the relative position; and updating, by taking maximization of the log-likelihood function as the training target, the weight matrix, the bias embedding, the word matrix embedding and the position matrix embedding of the position relation-based Skip-Gram.

5. The method of claim 4, wherein calculating the log-likelihood function according to the probability that the output word in the training sample appears at the position corresponding to the relative position comprises:

calculating the log-likelihood function by using the following formula:

$$\frac{1}{T}\sum_{t=1}^{T}\sum_{i=-c,i\neq 0}^{c}\left[\ln p(w_t|w_{t+i},pos_i) - \sum_{j=1}^{n} p(w_t|w_j,pos_{c+1})\right];$$

where $(w_{t+i}, w_t, pos_i)$ is a positive sample, $(w_j, w_t, pos_{c+1})$ is a negative sample, T is the number of training samples, t is a serial number of an identifier of an output word, $w_t$ is an identifier of a t1h output word, 2c is a size of a context window of an output word, −c and c respectively represent positions of two ends in the context window, c+1 represents a position outside the context window, the position of $w_t$ within the context window of the identifier of the $t^{th}$ output word is 0, the position of $w_{t+i}$ within the context window of the identifier of the $t^{th}$ output word is i, $pos_{c+1}$ represents a position of $w_{t+i}$ relative to $w_t$, n is a number of negative samples in a training sample using $w_t$ as the identifier of the output word, $w_j$ is an identifier of an input word in a $j^{th}$ negative sample in the training sample using $w_t$ as the identifier of the output word, $pos_{c+1}$ represents a position of $w_j$ relative to $w_t$, 1n represents a log function having a base e, $p(w_t|w_{t+i}, pos_i)$ is a probability that an identifier of an output word at a position corresponding to $pos_i$ is $w_t$ when the identifier of the input word is $w_{t+i}$, and $p(w_t|w_j, pos_{c+1})$ is a probability that an identifier of an output word at a position corresponding to $pos_{c+1}$ is $w_t$ when the identifier of the input word is $w_j$, where $$p(w_t|w_{t+i},pos_i)=\frac{\exp\left(\left(\vec{w_t^T}\bullet W+B\right)\bullet(\vec{w_{t+i}}+\vec{pos_i})\right)}{\sum_{k=1}^{n}\exp\left(\left(\vec{w_k^T}\bullet W+B\right)\bullet(\vec{w_{t+i}}+\vec{pos_i})\right)+\exp\left(\left(\vec{w_t^T}\bullet W+B\right)\bullet(\vec{w_{t+i}}+\vec{pos_i})\right)};$$

$$p(w_t|w_j,pos_{c+1})=\frac{\exp\left(\left(\vec{w_t^T}\bullet W+B\right)\bullet(\vec{w_j}+\vec{pos_{c+1}})\right)}{\sum_{k=1}^{n}\exp\left(\left(\vec{w_k^T}\bullet W+B\right)\bullet(\vec{w_j}+\vec{pos_{c+1}})\right)+\exp\left(\left(\vec{w_t^T}\bullet W+B\right)\bullet(\vec{w_j}+\vec{pos_{c+1}})\right)};$$

exp represents an exponential function having a base e; $\vec{w_k^T}$ is a transposed matrix of $\vec{w_k}$, $\vec{w_k}$ is a word matrix embedding of a input word corresponding to $w_k$, and $w_k$ represents an identifier of an input word in any negative sample; $\vec{w_{t+i}^T}$ is a transposed matrix of $\vec{w_{t+i}}$, $\vec{w_{t+i}}$ is a word matrix embedding of a input word corresponding to $w_{t+i}$, $\vec{pos_i}$ is a position matrix embedding corresponding to $pos_i$; $\vec{w_j^T}$ is a transposed matrix of $\vec{w_j}$, $\vec{w_j}$ is a word matrix embedding of a input word corresponding to $w_j$, $\vec{pos_{c+1}}$ is a position matrix embedding corresponding to $pos_{c+1}$; and ● represents matrix point multiplication.

6. The method of claim 4, wherein updating, by taking the maximization of the log-likelihood function as the training target, the weight matrix, the bias embedding, the word matrix embedding and the position matrix embedding of the position relation-based Skip-Gram comprises:

updating, using a stochastic gradient descent learning algorithm, the weight matrix, the bias embedding, the word matrix embedding and the position matrix embedding of the position relation-based Skip-Gram.

7. The method of claim 1, further comprising:
acquiring a word to be predicted; and
calling the trained position relation-based Continuous Skip-Gram to predict a context of the word to be predicted.

8. An apparatus based on a neural network model, comprising:
a processor; and
a memory configured to store instructions executable by the processor,
wherein the processor is configured to:
acquire a plurality of training samples, each of the training samples comprising an identifier of an input word, an identifier of an output word, and position information, wherein in one of the training samples, the output word is a context of the input word, and the position information indicates a relative position between the output word and the input word;
call a position relation-based Continuous Skip-gram Model (Skip-Gram), with each of the training samples as an input, to obtain an output result, the output result comprising a word matrix embedding of the input word, a word matrix embedding of the output word and a position matrix embedding of the position information, wherein the position relation-based Skip-Gram comprises an input laver, a hidden layer and an output layer that are sequentially connected, the hidden layer having a weight matrix W and a bias embedding B, $W \in R^{N \times (N+M)}$, $B \in R^{N+M}$, where R represents a dictionary, N represents dimensions of a word matrix embedding of the input word and a word matrix embedding of the output word, M represents dimension of the position matrix embedding, and + represents embedding concatenation; and updating the position relation-based Skip-Grain based on the output result to train the position relation-based Skip-Gram.

9. The apparatus of claim 8, wherein the processor is further configured to perform sampling on a training text;
perform word segmentation on the sampled training text to obtain a plurality of words;
search for an identifier of each of the plurality of words in a dictionary;
select identifiers of two words that are within a predetermined distance range, wherein an identifier of one of the two words is selected as an identifier of the input word and an identifier of the other of the two words is selected as an identifier of the output word;
determine the relative position between the input word and the output word to obtain the position information; and generate the training samples according to the identifier of the input word, the identifier of the output word and the position information.

10. The apparatus of claim 8, wherein, when updating the position relation-based Skip-Gram based on the output result, the processor is further configured to:
determine, based on the output result, a probability that the output word appears in the training sample at a position corresponding to the relative position; and
update, based on the probability, the weight matrix, the bias embedding, the word matrix embedding and the position matrix embedding of the position relation-based Skip-Gram according to a training target.

11. The apparatus of claim 10, wherein, when updating, based on the probability, the weight matrix, the bias embedding, the word matrix embedding and the position matrix embedding of the position relation-based Skip-Gram according to the training target, the processor is further configured to:
calculate a log-likelihood function according to the probability that the output word in the training sample appears at the position corresponding to the relative position; and
update, by taking maximization of the log-likelihood function as the training target, the weight matrix, the bias embedding, the word matrix embedding and the position matrix embedding of the position relation-based Skip-Gram.

12. The apparatus of claim 11, wherein, when calculating the log-likelihood function according to the probability that the output word in the training sample appears at the position corresponding to the relative position, the processor is further configured to:
calculate the log-likelihood function by using the following formula:

$$\frac{1}{T} \sum_{t=1}^{T} \sum_{i=-c, i \neq 0}^{c} \left[ ln p(w_t | w_{t+i}, pos_i) - \sum_{j=1}^{n} p(w_t | w_j, pos_{c+1}) \right];$$

where $(w_{t+i}, w_t, pos_i)$ is a positive sample, $(w_j, w_t, pos_{c+1})$ is a negative sample, T is the number of training samples, t is a serial number of an identifier of an output word, $w_t$ is an identifier of a t1h output word, 2c is a size of a context window of an output word, −c and c respectively represent positions of two ends in the context window, c+1 represents a position outside the context window, the position of $w_t$ within the context window of the identifier of the $t^{th}$ output word is 0, the position of $w_{t+i}$ within the context window of the identifier of the $t^{th}$ output word is i, $pos_{c+1}$ represents a position of $w_{t+i}$ relative to $w_t$, n is a number of negative samples in a training sample using $w_t$ as the identifier of the output word, $w_j$ is an identifier of an input word in a $j^{th}$ negative sample in the training sample using $w_t$ as the identifier of the output word, $pos_{c+1}$ represents a position of $w_j$ relative to $w_t$, ln represents a log function having a base e, $p(w_t|w_{t+i}, pos_i)$ is a probability that an identifier of an output word at a position corresponding to $pos_i$ is $w_t$ when the identifier of the input word is $w_{t+i}$, and $p(w_t|w_j, pos_{c+1})$ is a probability that an identifier of an output word at a position corresponding to $pos_{c+1}$ is $w_t$ when the identifier of the input word is $w_j$, where $$p(w_t | w_{t+i}, pos_i) = \frac{\exp\left(\left(\vec{w_t}^T \bullet W + B\right) \bullet (\vec{w_{t+i}} + \vec{pos_i})\right)}{\sum_{k=1}^{n} \exp\left(\left(\vec{w_k}^T \bullet W + B\right) \bullet (\vec{w_{t+i}} + \vec{pos_i})\right) + \exp\left(\left(\vec{w_t}^T \bullet W + B\right) \bullet (\vec{w_{t+i}} + \vec{pos_i})\right)};$$

$$p(w_t | w_j, pos_{c+1}) = \frac{\exp\left(\left(\vec{w_t}^T \bullet W + B\right) \bullet (\vec{w_j} + \vec{pos_{c+1}})\right)}{\sum_{k=1}^{n} \exp\left(\left(\vec{w_k}^T \bullet W + B\right) \bullet (\vec{w_j} + \vec{pos_{c+1}})\right) + \exp\left(\left(\vec{w_t}^T \bullet W + B\right) \bullet (\vec{w_j} + \vec{pos_{c+1}})\right)};$$

exp represents an exponential function having a base e; $\vec{w_k}^T$ is a transposed matrix of $\vec{w_k}$, $\vec{w_k}$ is a word matrix embedding of a input word corresponding to $w_k$, and $w_k$ represents an identifier of an input word in any negative sample; $\vec{w_{t+i}}^T$ is a transposed matrix of $\vec{w_{t+i}}$, $\vec{w_{t+i}}$ is a word matrix embedding of a input word corresponding to $w_{t+i}$, $\vec{pos_i}$ is a position matrix embedding corresponding to $pos_i$; $\vec{w_j}^T$ is a transposed matrix of $\vec{w_j}$, $\vec{w_j}$ is a word matrix embedding of a input word corresponding to $w_j$, $\vec{pos_{c+1}}$ is a position matrix embedding corresponding to $pos_{c+1}$; and ● represents matrix point multiplication.

13. The apparatus of claim 11, wherein, when updating, by taking the maximization of the log-likelihood function as the training target, the weight matrix, the bias embedding, the word matrix embedding and the position matrix embedding of the position relation-based Skip- Gram, the processor is further configured to:
update, using a stochastic gradient descent learning algorithm, the weight matrix, the bias embedding, the word matrix embedding and the position matrix embedding of the position relation-based Skip-Gram.

14. The apparatus of claim 8, wherein the processor is further configured to:
acquire a word to be predicted; and
call the trained position relation-based Continuous Skip-Gram to predict a context of the word to be predicted.

15. A non-transitory computer-readable storage medium having stored therein instructions that, when executed by at least one processor of an apparatus based on a neural network model, cause the apparatus to:
  acquire a plurality of training samples, each of the training samples comprising an identifier of an input word, an identifier of an output word, and position information, wherein in one of the training samples, the output word belongs to a context of the input word, and the position information indicates a relative position of the output word and the input word;
  call a position relation-based Continuous Skip-gram Model (Skip-Gram), inputting each of the training samples to the position relation-based Skip-Gram to obtain an output result, the output result comprising a word matrix embedding of the input word, a word matrix embedding of the output word and a position matrix embedding of the position information, wherein the position relation-based Skip-Gram comprises an input layer, a hidden layer and an output layer that are sequentially connected, the hidden layer having a weight matrix W and a bias embedding B, $W \in R^{N \times (N+M)}$, $B \in R^{N+M}$, where R represents a dictionary, N represents dimensions of a word matrix embedding of the input word and a word matrix embedding of the output word, M represents dimension of the position matrix embedding, and + represents embedding concatenation; and
  updating the position relation-based Skip-Grain based on the output result to train the position relation-based Skip-Gram.

\* \* \* \* \*